(12) United States Patent
Takashima et al.

(10) Patent No.: US 6,634,628 B2
(45) Date of Patent: Oct. 21, 2003

(54) LIQUID FILLED VIBRATION ISOLATION DEVICE

(75) Inventors: Yukio Takashima, Osaka (JP); Yosei Kodama, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 10/049,593

(22) PCT Filed: Jul. 25, 2001

(86) PCT No.: PCT/JP01/06418
§ 371 (c)(1),
(2), (4) Date: Mar. 13, 2002

(87) PCT Pub. No.: WO02/16799
PCT Pub. Date: Feb. 28, 2002

(65) Prior Publication Data
US 2002/0135114 A1 Sep. 26, 2002

(30) Foreign Application Priority Data
Aug. 24, 2000 (JP) .................................... 2000-254149

(51) Int. Cl.[7] .................................................. F16F 5/00
(52) U.S. Cl. ............................................... 267/140.13
(58) Field of Search ................... 267/140.13, 140.3, 267/140.4, 141.6, 141.7, 35, 219; 248/562, 636

(56) References Cited

U.S. PATENT DOCUMENTS 5,499,799 A 3/1996 Kojima
6,412,760 B2 * 7/2002 Shimoda et al. ........ 267/140.13
2002/0158391 A1 * 10/2002 Kodama et al. ........ 267/140.13

FOREIGN PATENT DOCUMENTS

| EP | 0957284 | | 11/1999 |
|---|---|---|---|
| JP | 357163746 A | * | 10/1982 |
| JP | 360184739 A | * | 9/1985 |
| JP | 5-19696 | | 3/1993 |
| JP | 10-9333 | | 1/1998 |
| JP | 2000-230600 | | 8/2000 |
| JP | 2000-274480 | | 10/2000 |

* cited by examiner

Primary Examiner—Christopher P. Schwartz
Assistant Examiner—Xuan Lan Nguyen
(74) Attorney, Agent, or Firm—Jordan and Hamburg LLP

(57) ABSTRACT

A liquid-in vibration isolator has an orifice hole mainly for audible sound provided on a first sub-liquid chamber and connected to a second sub-liquid chamber. When the first sub-liquid chamber is reduced to lower pressure and contracted due to large downward displacement caused by vibration and the diaphragm of the vibration isolator approaches the partition portion of the vibration isolator, the center plate portion of the orifice member is a convex with the center portion projected to the first sub-liquid chamber side, and the orifice hole is provided at a low portion of the center plate portion disposed eccentrically with respect to the isolator axis. Therefore, even being in contact with the center plate portion, the diaphragm hardly comes into contact with the orifice hole, or if it comes into contact with the orifice hole, it does not cover the orifice hole so as to interfere with proper function of the orifice hole.

5 Claims, 4 Drawing Sheets

LIQUID FILLED VIBRATION ISOLATION DEVICE

BACKGROUND

This invention relates to a liquid-filled vibration-isolating device used to support a vibration generating source such as vehicle engine for the purpose of vibration isolation.

A liquid-filled vibration isolator, in which a lower portion of a cylindrical body fitting and an attachment fitting disposed at an axis center are connected through a vibration isolating substrate made of a rubber elastomer, a diaphragm made of a rubber film is fitted and adhered above the cylindrical body fitting, liquid is contained in an inner chamber surrounded by the diaphragm and the vibration isolating substrate, a partition portion is interposed between the vibration isolating substrate and the diaphragm to partition a main liquid chamber on the attachment fitting side and a sub-liquid chamber on the diaphragm side, both liquid chambers are connected by an orifice on an outer circumference of the partition portion, an attachment fitting attached to the axis center of the vibration isolating substrate is connected to the vibration generating source side, the cylindrical body fitting is connected on the vehicle body support side, and the vibration damping function and the vibration isolating function are exhibited by the liquid flow effects of both liquid chambers and the vibration absorbing effects of the vibration isolating substrate by means of the orifice, has heretofore been known as a mount supporting a vibration generating source such as vehicle engine so as not to transmit its vibration to a vehicle body and the like.

As properties of the liquid-in vibration isolating device, it is an important factor to set sectional area and the like of the orifice for shake vibration on the outer circumference of the partition portion to the desired dimensions to obtain stable product properties without variation. Furthermore, it is desired to be able to reduce the dynamic spring rate in both relatively low frequency range (10 to 15 Hz) of shake vibration and the like and relatively high frequency range (100 to 200 Hz) of idle sound and the like from the viewpoint of vibration prevention or noise preventive effects as a mount for the vehicle engine and the like.

Accordingly, in addition to the liquid-filled vibration isolating device, another liquid-filled vibration isolating device is also suggested, in which the partition portion comprises a partition plate member made of an elastic film at its center portion and an orifice member disposed on the first sub-liquid chamber side of the partition plate member, a hollow space between the center plate portion of the orifice member and the elastic film is formed as a second sub-liquid chamber, independently of the orifice for shake vibration on the outer circumference which passes through the first sub-liquid chamber on the diaphragm side and between the sub-liquid chamber and the main liquid chamber, the orifice hole for idling sound is opened on the center plate portion from the first sub-liquid chamber to the second sub-liquid chamber, so as to reduce variation of the properties and also reduce the dynamic spring rate in both frequency bands of shake vibration and idling sound.

Incidentally, in the case of the configuration with two sub-liquid chambers described above, as the pressure of the main liquid chamber varies due to vibration, mainly vibration in the vertical direction, on the vibration generating source side such as an engine connected to the attachment fitting, inside liquid flows, liquid in the first sub-liquid chamber increases/decreases, and consequently the diaphragm at the upper portion constituting a chamber wall of the sub-liquid chamber approaches the partition portion and deforms in the direction of separation. At this time, when the diaphragm is displaced downwards greatly and approaches the partition portion, it is apprehended that the diaphragm comes into contact with the upper surface of the orifice member at the upper side of the partition portion and covers the orifice hole of the second sub-liquid chamber.

That is, the diaphragm is apt to displace at a closer portion to the center. Therefore, the diaphragm comes into contact with the center portion at first against the orifice member due to large displacement, and its contact area sequentially spreads around the center portion. If the center plate portion of the orifice member is flat, the diaphragm relatively quickly comes into contact all over the surface of the center plate portion.

Therefore, when largely displaced downwards, it is feared that the diaphragm covers the orifice hole for idling sound to disable its function. Furthermore, there is the possibility of scratching the diaphragm at the opening end of the orifice hole.

In order to settle the problems above, it is also considered to set the volume of the first sub-liquid chamber sufficiently large. If the volume of the first sub-liquid chamber is set sufficiently large, however, it is not preferable from the viewpoint of vehicle considerations and the like, because the vibration isolating device itself grows larger.

SUMMARY

It is an object of the present invention to provide a liquid-filled vibration isolating device, equipped with second sub-liquid chamber connecting through an orifice hole for idling sound to the first sub-liquid chamber, apart from the first sub-liquid chamber described above, capable of maintaining its function properly without the orifice hole covered being the diaphragm, even if the volume of the first sub-liquid chamber is not increased.

As for a liquid-in vibration isolating device of the present invention, the lower portion of a cylindrical body fitting and an attachment fitting disposed at an axis center portion thereof are coupled through a vibration isolating substrate made of a rubber elastomer, a diaphragm made of a rubber film is bonded to the upper portion of the cylindrical body fitting to cover an opening at the upper portion, liquid is contained in an inner chamber between the vibration isolating device and the diaphragm, the inner chamber is partitioned into a main liquid chamber on the side of the attachment fitting and a first sub-liquid chamber on the side of the diaphragm by a partition portion, both liquid chambers are connected by a first orifice, wherein the partition portion comprises a partition plate member with an elastic film used for the center portion, and an orifice member disposed so as to push and come into contact with the circumferential portion of the elastic film to the partition plate member on the first sub-liquid chamber side, the first orifice is formed between the outer circumferential portion of the orifice member and the outer circumferential portion of the partition member, a hollow space between the center plate portion inward the pushing and coming into contact portion of the orifice member and the elastic film is formed as a second sub-liquid chamber, an orifice hole is opened on the center plate portion from the first sub-liquid chamber to the second sub-liquid chamber, the center plate portion of the orifice member is in a form of a convex with higher center portion faced toward the first sub-liquid chamber, and the orifice hole is provided at a low level portion of the center plate portion disposed eccentrically with respect to the device axis center.

According to the liquid-in vibration isolating device, since an orifice hole mainly for idling sound is provided on the first sub-liquid chamber and connected to the second sub-liquid chamber, in addition to the first orifice on the outer circumferential portion for shake vibration, the dynamic spring rate can be reduced in different frequency ranges of that for shake vibration (10 to 15 Hz) and relatively high range (100 to 200 Hz) for idle vibration and the like, respectively, thus effectively accomplishing vibration damping in a wide frequency range.

Especially, when the first sub-liquid chamber is reduced to lower pressure and contracted due to large downward displacement caused by vibration and the diaphragm approaches the partition portion, the center plate portion of the orifice member is in the form of a convexity with the center portion projected to the first sub-liquid chamber side, and the orifice hole is provided at a low level portion of the center plate portion disposed eccentrically with respect to the device axis center. Therefore, even being in contact with the center plate portion, the diaphragm hardly comes in contact with the orifice hole, or if it comes into contact with the orifice hole, it does not cover the orifice hole completely or earlier, allowing the function of the orifice hole to be maintained properly.

Further, since the diaphragm hardly come into contact with the orifice hole portion, the diaphragm is not broken even if the volume of the first sub-liquid chamber is small, thus durability can also be maintained properly.

As for the liquid-in vibration isolating device, it is preferable that the orifice hole is eccentrically positioned opposite to the interconnecting portion from the first orifice on the outer circumferential portion of the orifice member to the first sub-liquid chamber. This can prevent the first orifice and the orifice hole from interfering to each other, further allowing the properties to be stable.

As for the liquid-in vibration isolating device, since there is no difference in step on the upper surface of the center plate portion when the upper surface of the center plate portion of the orifice member is in the form of a convexity toward the first sub-liquid chamber side, the diaphragm naturally comes into contact, thus preventing the diaphragm from being damaged. Furthermore, when the lower surface of the second sub-liquid chamber of the center plate portion assumes a curved surface form corresponding to the upper surface, it can cope with large deformation of the elastic film which assumes a chamber wall of the second sub-liquid chamber opposite to the center plate portion, thus avoiding the elastic film from increasing local distortion.

As for the liquid-filled vibration isolating device, it is preferable that the interconnecting portion from the first orifice to the first sub-liquid chamber is opened at a place where the diaphragm is difficult to come into contact on the outer circumferential portion of the orifice member, and further that the interconnecting portion is opened so as to have an opening edge on the extended upper surface of the center plate portion of the orifice member.

This can properly maintain both functions of the first orifice for shake vibration and the orifice hole for idling sound in conjunction with blockage preventive effects of the orifice hole, without blocking up the interconnecting portion to the first orifice, when the first sub-liquid chamber is reduced to lower pressure or contracted during large displacement.

As for the liquid-filled vibration isolating device, it is preferable that the partition plate member of the partition portion is formed by vulcanization adhering the elastic film such as rubber to the center opening portion of the press molded metal plate, and that the orifice member is made up of the molded materials of metals such as aluminum and its alloys or ceramic or synthetic resin materials. This can raise dimensional accuracy of the orifice.

BEST MODE FOR CARRYING OUT THE INVENTION

Figure 1:
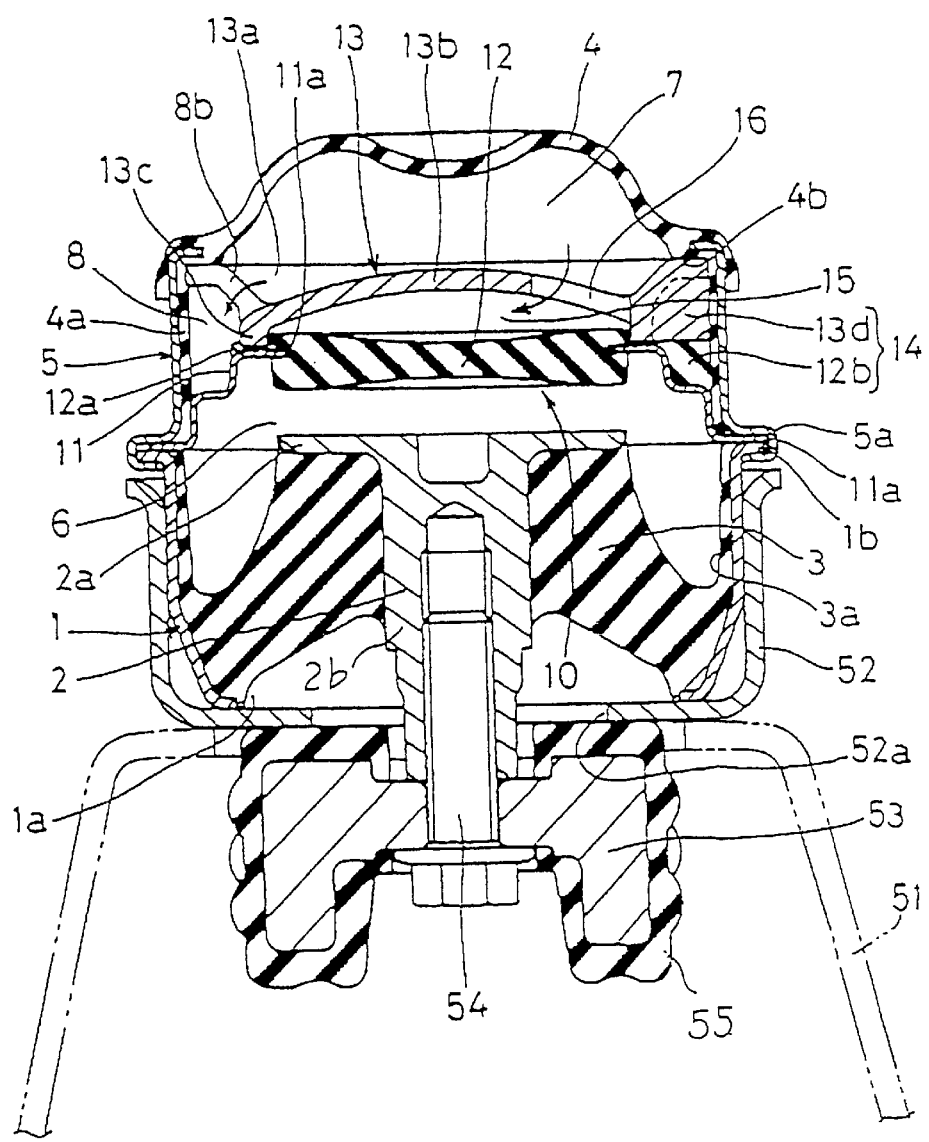
FIG. 1 is a sectional view of a liquid-in vibration isolating device of the present invention.
Figure 2:
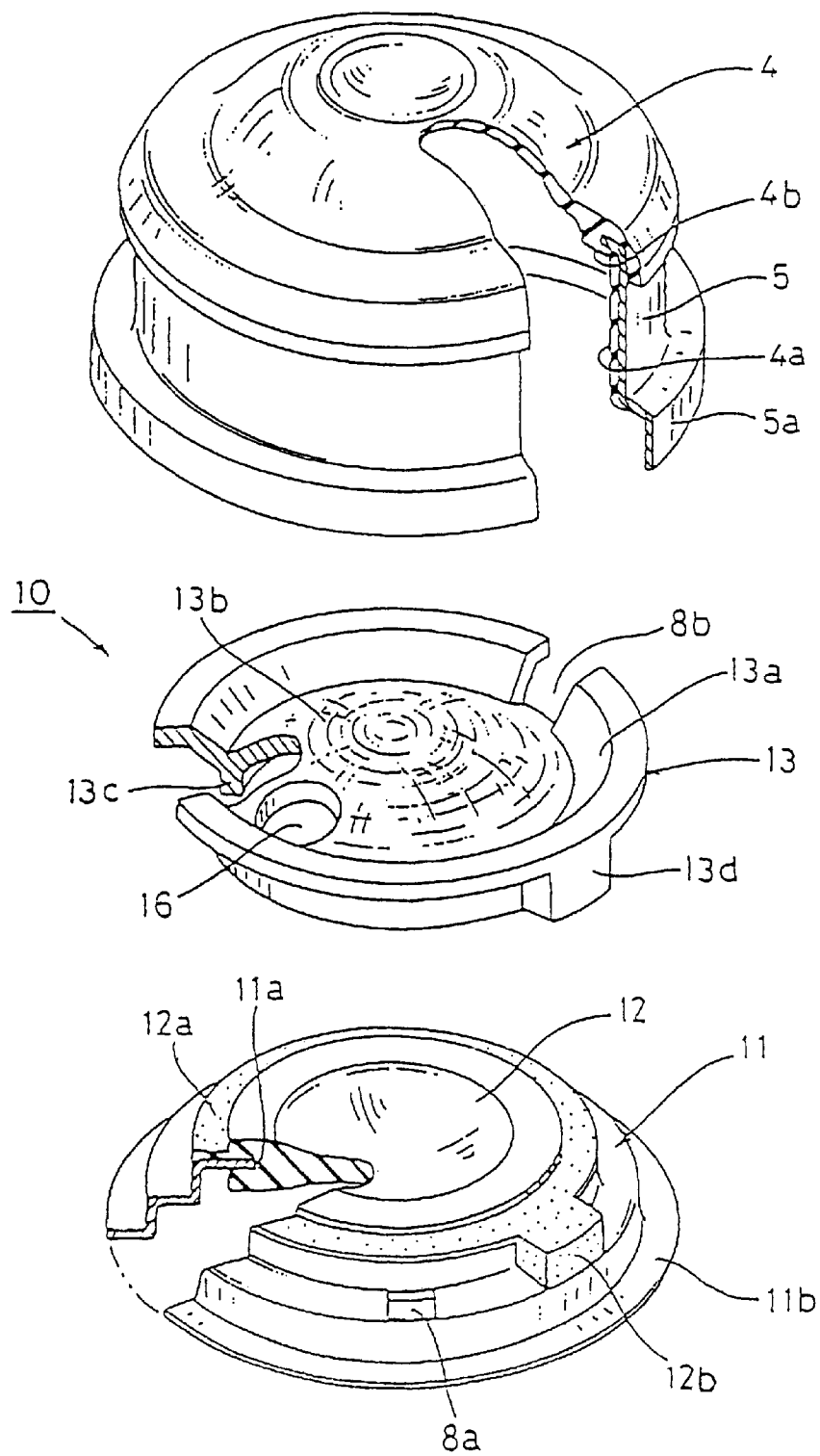
FIG. 2 is a partially cutaway view in perspective of a diaphragm and a partition member.
Figure 3:
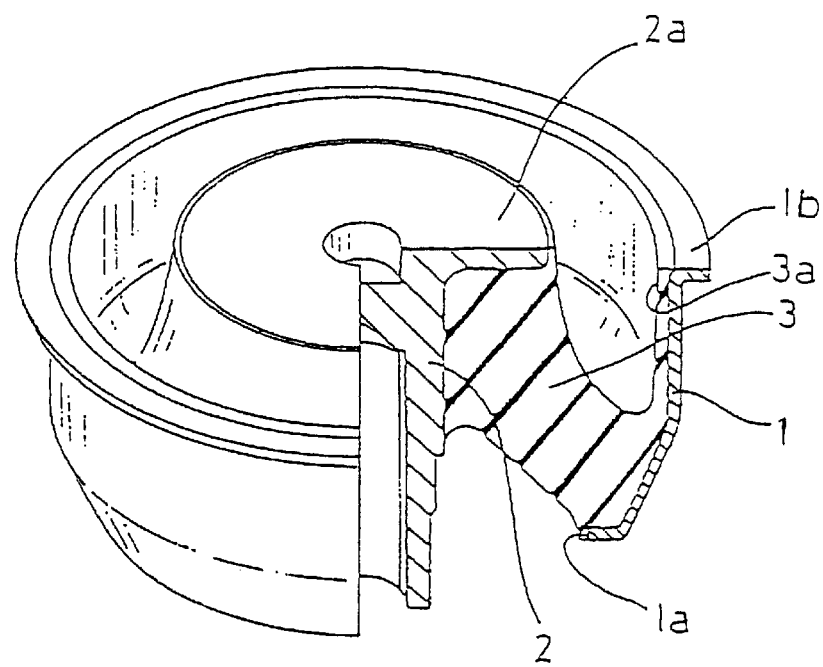
FIG. 3 is a partially cutaway view in perspective of a cylindrical body fitting, a vibration isolating substrate and an attachment fitting.

This invention will hereinafter be described in details with reference to the accompanying drawings.

In the drawings, as for the liquid-in vibration isolating device of the present invention, the lower portion of a cylindrical body fitting 1 and an attachment fitting 2 disposed to an axis center thereof are connected through a vibration isolating substrate 3 made of a rubber elastomer, a diaphragm 4 made of a rubber film is connected above the cylindrical body fitting 1 so as to cover an opening of the upper portion, liquid is contained in an inner chamber between the vibration isolating substrate 3 and the diaphragm 4, a main liquid chamber 6 on the attachment fitting 2 side and a first sub-liquid chamber 7 on the diaphragm side are parted by a partition portion 10, and both liquid chambers 6, 7 are connected by a first orifice 8 formed on an outer circumference of a partition portion 5.

The cylindrical body fitting I has a rough cup form having an opening 1a at the bottom, and is connected/fixed and supported by press-fitting in a holding barrel 52 having a rough cup form with an open bottom provided at an upper portion of a support side member 51 as shown in the drawings, with respect to the support side member 51 such as frame on a vehicle body side. Of course, the cylindrical body fitting 1 can also be supported with other support means connected and secured to an outer circumference of the cylindrical body fitting 1.

The attachment fitting 2 integrally has a flange portion 2a of large diameter, spreading like an umbrella at an upper extremity of a shaft portion 2b. The shaft portion 2b is a boss type capable of threading to a bolt 54 from a lower portion into the axis center. The upper end flange portion 2a of the attachment fitting 2 is near the opening at the upper portion of the cylindrical body fitting 1. The lower end of the shaft portion 2b is projected downwardly from the opening 1a at the bottom of the cylindrical body fitting 1 and an opening 52a at the bottom of the holding barrel 52. A link member 53, on the vibration generating source side such as engine, is tightened to a lower extremity of the shaft portion 2b by a bolt 54.

A rubber portion 55 is attached to the outer circumference of the link member 53. By abutting on the bottom portion of the holding barrel 52, the rubber portion 55 can restrain the link member 53 from displacing upwards largely beyond that.

FIG. 1 shows the condition that a load, such as an engine, is not applied. When any load is applied, the rubber portion 55 is held under the condition of being separated from the bottom of the holding barrel 52, and the volume of the first sub-liquid chamber 7 is also reduced.

As shown in FIG. 1, the vibration isolating substrate 3 assumes nearly an umbrella form. The lower the position of the vibration isolating substrate 3, the larger the diameter and the thicker the vibration isolating substrate 3 becomes. The upper portion is vulcanization adhered to a lower surface of the flange portion 2a of the attachment fitting 2 and to an outer circumference of the shaft portion 2b, and a lower extremity is also vulcanization adhered to an inner circumference of a lower extremity of the cylindrical body fitting 1. A rubber layer 3a is integral with the vibration isolating substrate 3 and fitted to the inner circumference of the cylindrical body fitting 1.

The diaphragm 4 has a predetermined curvature and sectional length so as to naturally follow variation of liquid pressure in the inner chamber, and an outer circumferential portion thereof is vulcanization adhered to the reinforcing cylindrical member 5. The cylindrical member 5 is bonded to the cylindrical body fitting 1 when a lower extremity 5a thereof is caulked and secured to an upper extremity 1b of the cylindrical body fitting 1. Furthermore, a cylindrical rubber portion 4a of a predetermined thickness is molded in one piece to a outer circumferential edge of the diaphragm 4 and is vulcanization adhered to an inner circumference of the cylindrical member 5. A positioning step portion 4b for abutting and positioning an outer circumferential edge portion of an orifice member 13 is formed at a boundary between the upper end of the cylindrical rubber portion 4a and the outer circumferential edge of the diaphragm 4.

As shown in the drawings, the partition portion 10 comprises a partition plate member 11 with an elastic film 12 fast stuck to a center opening portion 11a by vulcanization adhering means, and the orifice member 13 disposed on the first sub-liquid chamber 7 side of the partition plate member 11.

The partition plate member 11 is formed by vulcanization adhering the elastic film 12, such as rubber and the like, to the center opening portion 11a of a press molded metal plate, and an outer circumferential edge portion 11b thereof is fast stuck and fixed to the caulking and tightening portion between the lower extremity 5a of the cylindrical member 5 and the upper extremity 1b of the cylindrical body fitting 1. An interconnecting opening 8a, communicating the first orifice 8 to the main liquid chamber 6, is opened on the outer circumferential portion of the partition plate member 11.

The orifice member 13 is press-fitted and adhered through the cylindrical rubber portion 4a inside the cylindrical member 5, and the outer circumferential edge portion thereof abuts on the positioning step portion 4b at the upper end of the cylindrical rubber portion 4a before positioning.

An outer circumferential portion 13a having a conical form, a center plate portion 13b, and a ring-shaped convex portion 13c present on a lower surface of the circumferential edge portion of the center plate portion 13b are integrally molded by metals such as aluminum and its alloy or ceramics and synthetic resin mold materials to form the orifice member 13.

The ring-shaped convex portion 13c is pushed and brought into contact with a circumferential portion 12a of the elastic film 12 so as to provide a sealing condition, and a hollow space between the partition plate member 11 and the orifice member 13 is divided into an inward portion and a ring-shaped outward portion.

An outward portion of the ring-shaped convex portion 13c forms the first orifice 8 in a nearly ring form, a part of which is blocked by the screen portion 14. The first orifice 8 is formed between the outer circumferential portion 13a of the orifice member 13 and a stepped outer circumferential portion of the partition plate member 11. An interconnecting opening 8b connecting the first orifice 8 with the first sub-liquid chamber 7 is opened on the outer circumferential portion 13a of the orifice member 13.

The screen portion 14 is formed by a part 13d of the orifice member 13 and a rubber portion 12b vulcanization adhered to the partition plate member 11.

A hollow space surrounded by the center plate portion 13b of the orifice member 13 and the upper surface of the elastic film 12 is formed as a second sub-liquid chamber 15, and an orifice hole 16 for idling sound connect the first sub-liquid chamber 7 to the second sub-liquid chamber 15 and is opened on the center plate portion 13b of the orifice member 13.

The center plate portion 13b of the orifice member 13 has a convex form with higher center portion faced toward the first sub-liquid chamber 7. The orifice hole 16 is eccentric to a device axis center and present at a low level portion of the center plate portion 13b, and provided at the low level portion where the diaphragm 4 comes into little contact or comes into contact as late as possible, especially when the pressure of the first sub-liquid chamber 7 is reduced due to large downward displacement.

For example, in the embodiments shown in FIGS. 1 to 4, the upper surface of the center plate portion 13b has a convex form of a predetermined curvature with respect to the first sub-liquid chamber 7, and the orifice hole 16 is provided at the low level portion within the aforementioned curvature away from the center portion. An opening portion of the orifice hole 16 can also be formed by further slightly being lowered below the convex surface of the aforementioned curvature.

Figure 4:
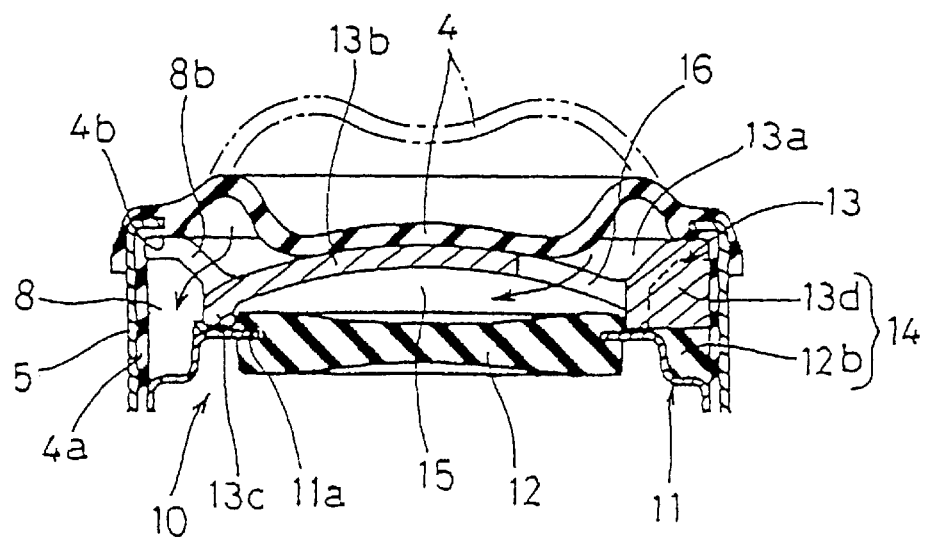
FIG. 4 is a partially sectional view showing the state of contact with the partition member portion of the diaphragm.
Figure 5:
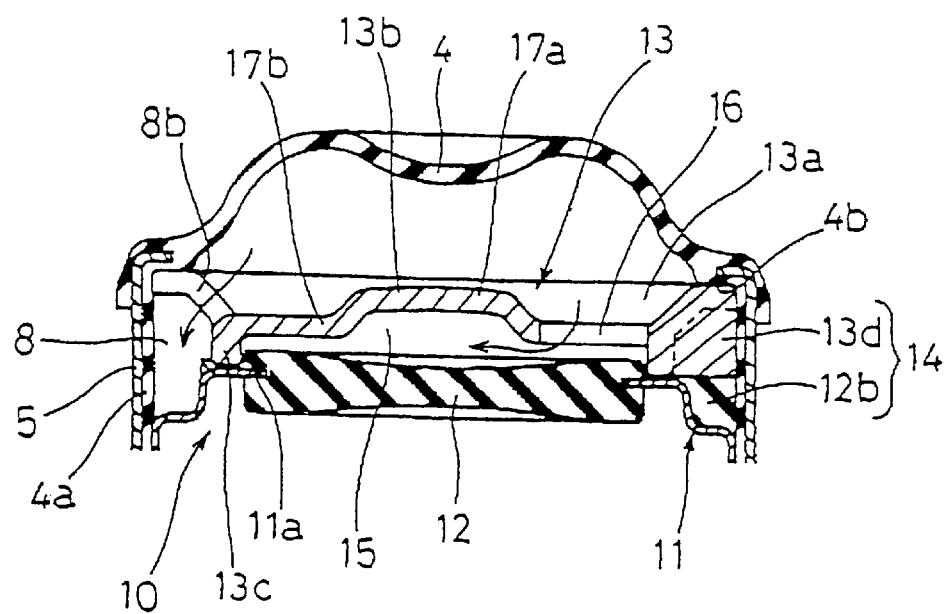
FIG. 5 is a partially sectional view showing other embodiment of an orifice member of the partition portion.

The center plate portion 13b is not limited to those having the convex surface form as shown in FIGS. 1 to 4, but the center portion 17a, as shown in FIG. 5, can be formed to assume a convex form toward the first sub-liquid chamber 7 and the orifice hole 16 can also be formed on the outward side portion 17b which will become the low level portion. In this case, from the viewpoint of preventing damage of diaphragm 4 which comes into contact with the step portion between the center portion 17a and the outward portion 17b, it is also preferable, as shown in the drawings, that the step portion between the center portion 17a and the outward portion 17b is formed by continuous R curve to avoid sharp edges from occurring.

The orifice hole 16 can be formed according to embodiments of other opening form if it is provided at the low level portion of the center plate portion 13b eccentrically disposed from the device axis center. However, in order to prevent the interconnecting opening 8b of the first orifice 8 and the orifice hole 16 from interfering mutually and to secure stable properties, the orifice hole 16 may be provided eccentrically on the reverse side to the position of the interconnecting opening 8b of the outer circumferential portion 13a, desirably by 180° on the opposite side.

The interconnecting opening of 8b of the first orifice 8 may be formed, on the outer circumferential portion 13a of the orifice member 13, at a place where it is difficult for the diaphragm 4 to come into contact even at the time of large downward displacement, especially preferably, so that there is an opening edge on the extended upper surface of the center plate portion 13b, whereby the proper function of the first orifice 8.

The partition plate member 11 is easily produced by vulcanization adhering the elastic film 12, such as rubber, to the center opening portion 11a of the press molded metal plate. The orifice member 13 may be made of metals, such as aluminum and its alloy, or ceramics and synthetic resin mold materials, which can easily provide dimensional accuracy. Accordingly, dimensional accuracy of sectional area of the first orifice 8 formed by both members can be improved.

As described above, while press-fitting and securing the cylindrical body fitting 1 to the holding barrel 52 present above the support side member 51 on the vehicle body side and linking the link member 53 on the vibration isolating source side, such as the engine, to the attachment fitting 2, the liquid-filled vibration isolating device made up of the aforementioned configuration is used with the engine and the like supported under a hanging down condition.

When vibration is propagated from the vibration generating source side of the engine and the like under the supporting condition and the vibration isolating substrate 3 deforms due to vibration, the liquid contained therein flows through the first orifice 8 present on the outer circumferential portion of the partition portion 10 or the orifice hole 16 present on the center plate portion 13b of the orifice member 13 between the main liquid chamber 6 and the first sub-liquid chamber 7 and between the first sub-liquid chamber 7 and the second sub-liquid chamber 15. Accordingly, the dynamic spring rate can effectively be reduced in a wider frequency range than ever due to each resonance characteristics of the first orifice 8 and the second orifice 16.

That is, the first orifice 8 present on the outer circumferential portion of the orifice member 13 is set so as to effectively exhibit vibration damping function in a frequency range of shake vibration. In addition to it, since the second sub-liquid chamber 15 is disposed mainly through the orifice hole 16 for idling sound on the side of the first sub-liquid chamber 7, the dynamic spring rate can be reduced in each frequency band of the frequency range of shake vibration (10 to 15 Hz) and the frequency range of idling sound (100 to 200 Hz), thus effectively bringing about vibration damping in significantly wide frequency range to be able to enhance noise prevention effect.

Further, when the first sub-liquid chamber 7 is reduced in pressure and contracted by large downward displacement due to vibration and the diaphragm 4 approaches the partition portion 10, the center plate portion 13b of the orifice member 13 is in the convex form with the center portion higher faced toward the first sub-liquid chamber 7 side and the orifice hole 16 is disposed at the low level portion of the center plate portion 13b eccentrically with respect to the device axis center. Therefore, even when the diaphragm 4 comes into contact with the center plate portion 13b from the center portion at first, the diaphragm 4 is hardly in contact with the orifice hole 16 as shown in FIG. 4 or does not cover the orifice hole 16 earlier or completely if it comes into contact. Besides, since the interconnecting opening 8b into the first orifice 8 present on the outer circumferential portion 13a of the orifice member 13 is not also covered, the function due to the first orifice 8 for shake vibration and the orifice hole 16 for idling sound can be maintained properly.

A liquid-filled vibration isolating device of the present invention can maintain function of a first orifice for shake vibration and an orifice hole for idling sound, without increasing a volume of a first sub-liquid chamber, by preventing blocking of the orifice hole for idling sound.

Accordingly, the dynamic spring rate is effectively reduced in different frequency ranges of shake vibration and fraught sound, whereby vibration and noise preventive effects can be exhibited in a wider frequency range. Furthermore, with regards to the structure of a partition portion, dimensional accuracy of an orifice of an outer circumferential portion for shake vibration can be improved, variation of the properties can also be reduced, thus exhibiting stable vibration isolating properties.

Therefore, the present invention can provide an optimum liquid-filled vibration isolating device for supporting the vibration generating source such as vehicle engine for the purpose of vibration isolation.

What is claimed is:

1. A vibration isolating device, comprising:
    a cylindrical body fitting having an upper portion defining an opening, and a lower portion;
    an attachment fitting;
    a vibration isolating substrate made of an elastomer;
    the lower portion of the cylindrical body fitting and the attachment fitting being coupled by the vibration isolating substrate;
    a diaphragm made of an elastic film bonded to the upper portion of the cylindrical body fitting to cover the opening at the upper portion;
    liquid contained in an inner chamber between the vibration isolating substrate and the diaphragm;
    a partition device partitioning the inner chamber into a main liquid chamber on a side of the attachment fitting and a first sub-liquid chamber on a side of the diaphragm by a partition portion;
    the partition device including a partition plate member with an elastic film as a center portion, and an orifice member contacting a circumferential portion of the elastic film of the partition plate member on the first sub-liquid chamber side to define a second sub-liquid chamber between the center portion of the partition plate member and a center plate portion of the orifice member;
    the partition device defining a first orifice formed between an outer circumferential portion of the orifice member and an outer circumferential portion of the partition plate member, the first orifice communicating the main liquid chamber with the first sub-liquid chamber;
    the center plate portion of the orifice member defining a second orifice communicating the first sub-liquid chamber to the second sub-liquid chamber;
    the center plate portion of the orifice member having a convex form with respect to the first sub-liquid chamber with a center apex portion faced toward the first sub-liquid chamber which is surrounded by a lower portion; and
    the second orifice being limited to the lower portion such that an entirety of the second orifice is below the center apex portion, and the second orifice being positioned on a side of the center apex portion opposite the first orifice.

2. The vibration isolating device as set forth in claim 1, wherein the convex form has a predetermined curvature toward the first sub-liquid chamber side.

3. The vibration isolating device as set forth in claim 1, wherein the first orifice opens on the outer circumferential portion of the orifice member thereby avoiding contact with the diaphragm.

4. The vibration isolating device as set forth in claim 3, wherein the outer circumferential portion of the orifice member has an extended upper surface above the lower portion and the first orifice opens so as to have an opening edge on the extended upper surface of the center plate portion of the orifice member.

5. The vibration isolating device as set forth in any one of claims 1 to 4, wherein the partition plate member, of the partition device, is formed by vulcanization adhering the elastic film to a center opening portion of a press molded metal plate, and the orifice member is formed of molded materials selected from the group consisting of metals, ceramic materials, and synthetic resin materials.

* * * * *